US010812475B2

(12) United States Patent
Covdy et al.

(10) Patent No.: US 10,812,475 B2
(45) Date of Patent: Oct. 20, 2020

(54) AUTHENTICATING ACCESS TO AN INSTANCE

(71) Applicant: ServiceNow, Inc., Santa Clara, CA (US)

(72) Inventors: Ivan Valentine Covdy, San Jose, CA (US); Ashok Ganesan, Milpitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 364 days.

(21) Appl. No.: 15/490,332

(22) Filed: Apr. 18, 2017

(65) Prior Publication Data

US 2018/0302400 A1   Oct. 18, 2018

(51) Int. Cl.
  *H04L 29/06*   (2006.01)
  *H04L 9/30*    (2006.01)
  *H04L 9/32*    (2006.01)

(52) U.S. Cl.
  CPC ........ *H04L 63/0853* (2013.01); *H04L 9/3066* (2013.01); *H04L 9/3252* (2013.01); *H04L 9/3297* (2013.01); *H04L 63/0442* (2013.01)

(58) Field of Classification Search
  CPC ............. H04L 63/0853; H04L 63/0442; H04L 9/3066; H04L 9/3252; H04L 9/3297
  USPC ........................................ 713/176, 150, 168
  See application file for complete search history.

(56) References Cited

U.S. PATENT DOCUMENTS

| 2002/0108042 A1* | 8/2002 | Oka .......................... H04L 9/14 713/175 |
| 2012/0110318 A1* | 5/2012 | Stone ..................... H04L 9/3234 713/150 |
| 2013/0117567 A1* | 5/2013 | Chang ................. G06F 9/45558 713/170 |
| 2013/0326614 A1* | 12/2013 | Truskovsky ............ G06F 21/44 726/19 |
| 2014/0026194 A1* | 1/2014 | Smith ................. G06F 21/6245 726/4 |
| 2014/0081932 A1* | 3/2014 | Krislov ............... G06F 21/6209 707/694 |
| 2014/0100885 A1* | 4/2014 | Stern ...................... G06Q 10/10 705/3 |
| 2014/0108792 A1* | 4/2014 | Borzycki ............ G06F 21/6218 713/165 |

(Continued)

*Primary Examiner* — Jahangir Kabir
(74) *Attorney, Agent, or Firm* — Fletcher Yoder PC

(57) ABSTRACT

A system, method, and non-transitory computer-readable storage medium for authenticating access to an instance have been disclosed. The system comprises a processor and a memory that includes instructions executable by the processor to cause the system to receive an access request to the instance from a client device and to send an encryption request of information to a security device. The information includes an expiration time and the security device encrypts the information using a private key that is secured in the security device. The memory includes further instructions executable by the processor to cause the system to receive the encrypted information from the security device and to send the encrypted information to the client device. The encrypted information is decryptable by the instance using a public key associated with the private key in response to the client device providing the encrypted information to the instance.

20 Claims, 10 Drawing Sheets

(56) References Cited

U.S. PATENT DOCUMENTS

| | | | | |
|---|---|---|---|---|
| 2014/0164776 A1* | 6/2014 | Hook | ............... | H04L 9/14 |
| | | | | 713/171 |
| 2014/0331060 A1* | 11/2014 | Hayton | ............... | G06F 21/31 |
| | | | | 713/186 |
| 2015/0058619 A1* | 2/2015 | Sweet | ............... | G06F 21/55 |
| | | | | 713/155 |
| 2015/0350179 A1* | 12/2015 | Kobayashi | ............... | H04L 63/08 |
| | | | | 726/4 |
| 2016/0044511 A1* | 2/2016 | Broch | ............... | H04W 12/06 |
| | | | | 726/4 |
| 2017/0223005 A1* | 8/2017 | Birgisson | ............... | H04L 12/2816 |
| 2018/0114595 A1* | 4/2018 | Stern | ............... | H04L 67/1004 |

\* cited by examiner

AUTHENTICATING ACCESS TO AN INSTANCE

TECHNICAL FIELD

This disclosure relates generally to authenticating access to an instance.

BACKGROUND

Instances of software in a single-tenant or multi-instance environment can operate on behalf of different tenants or customers. During the normal course of operation and customization, these customer instances can receive access requests that require authentication.

SUMMARY

Disclosed herein are implementations of systems, methods, and techniques for identifying resolutions based on recorded actions.

In an implementation, a system is provided for authenticating access to an instance. The system comprises a processor and a memory coupled to the processor, wherein the memory includes instructions executable by the processor to cause the system to receive an access request to the instance from a client device and to send an encryption request of information to a security device. The information includes an expiration time and the security device encrypts the information using a private key that is secured in the security device. The memory further includes instructions executable by the processor to cause the system to receive the encrypted information from the security device and to send the encrypted information to the client device. The encrypted information is decryptable by the instance using a public key associated with the private key in response to the client device providing the encrypted information to the instance.

In an implementation, a method is provided for authenticating access to an instance. The method comprises receiving an access request to the instance from a client device and sending an encryption request of information to a security device. The information includes an expiration time and the security device encrypts the information using a private key that is stored in the security device. The method further comprises receiving the encrypted information from the security device and sending the encrypted information to the client device. The encrypted information is decryptable by the instance using a public key associated with the private key in response to the client device providing the encrypted information to the instance.

In an implementation, a non-transitory computer-readable storage medium is provided for authenticating access to an instance. The non-transitory computer-readable storage medium includes executable instructions that, when executed by a processor, facilitate performance of operations. The operations comprise receiving an access request to the instance from a client device and sending an encryption request of information to a security device. The information includes an expiration time and the security device encrypts the information using a private key that is stored in the security device. The operations further comprise receiving the encrypted information from the security device and sending the encrypted information to the client device. The encrypted information is decryptable by the instance using a public key associated with the private key in response to the client device providing the encrypted information to the instance.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
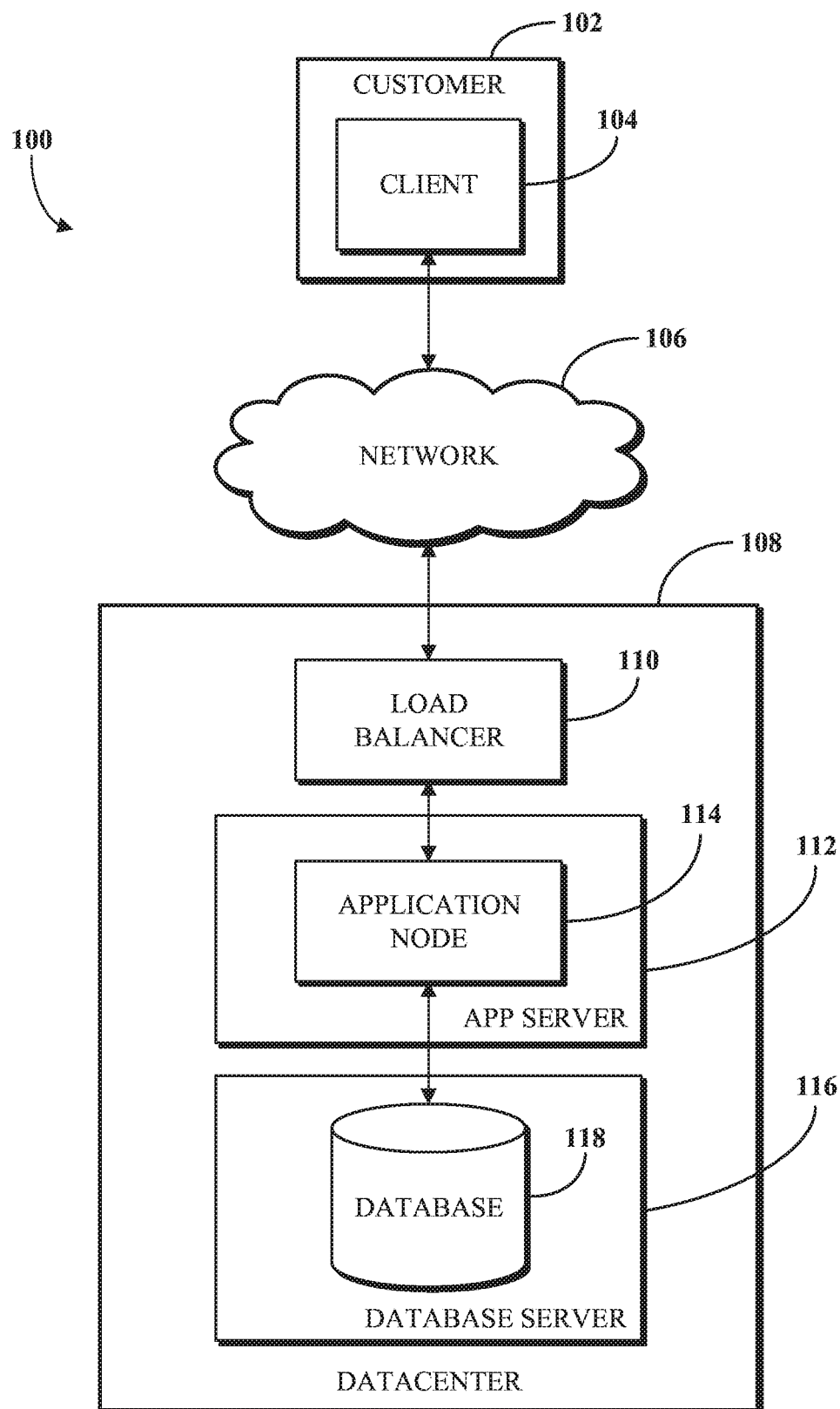
FIG. 1 is a block diagram illustrating an example electronic computing and communications system.

Customers of a computing (e.g., Platform-as-a-Service (PaaS)) provider can use or develop applications that operate on or using configurable platform software. An instance of the platform software can be implemented using one or more application nodes and database nodes, such as described later with respect to FIG. 1. The instance can receive access requests from numerous sources including but not limited to client devices or users in relation to usage or application development requirements. In some cases, it may be desirable to permit temporary access to an instance by a user of a client device that does not have a user account associated with the instance. To avoid unauthorized access to the instance, such access requests can be authenticated by implementations of the present disclosure prior to the granting of the access to the client device that has requested the access.

Implementations of the present disclosure provide a system (e.g., an authentication system) and a method for authenticating access to an instance. The authentication system can include a device (e.g., a server device) that receives the access request from a client device, that communicates with and submits an encryption request to a security device to generate encrypted information, and that sends or transmits the generated encrypted information back to the client device that utilizes the encrypted information to garner access to the instance. The authentication system can also include the security device that generates the encrypted information in response to receiving the encryption request from the server device. In some implementations, both the server device and the security device are combined into one device that carries out the aforementioned operations. The server device and the security device are, for example, separate from the instance for which access is requested.

In some implementations, the system can comprise a processor and a memory coupled to the processor. The memory can include instructions executable by the processor to cause the system to receive an access request to the instance from a client device (e.g., a user). In response to receiving the access request, the system sends an encryption request of information to a security device. The information can include a variety of information including but not limited to client device information, instance information, time information (e.g., expiration time), and location information. In response to receiving the encryption request (with the information), the security device can encrypt the received information using a private key that is secured in the security device. The private key can also be non-exportable and only accessible to a subset of administrators that can access the security device.

In response to receiving the encrypted information from the security device, the server device can send the encrypted information to the client device for usage in accessing the instance. The client device can submit the encrypted information to the instance which can then decrypt the encrypted information using a public key associated with the private key used to provide the encrypted information. If the decryption process carried out by the instance fails, then access to the instance by the client device can be denied or additional identification or verification information can be requested. If the encrypted information includes an expiration time (e.g., one week or a particular date/time), then the client device may be required to submit the encrypted information (which can also include a password or which can serve as a password) to the instance before the expiration time (i.e., the client device would have to submit the encrypted information before the end of the one week expiration time if one week was selected as the expiration time) to obtain access to the instance.

In some implementations, the expiration time is set by default to be greater than four hours (i.e., the generated encrypted information is valid for just four hours) from any of when the client device sends the access request, when the security device receives the encryption request, and when the client device receives the encrypted information back from the security device. Based on the predetermined expiration time, the client device can garner access to the instance prior to the end of the predetermined expiration time. For example, if the expiration time is set at four hours from when the client device receives the encrypted information, then the client device can submit the encrypted information to garner access to the instance until the four hours expires.

By providing such an authentication system, various devices and device configurations can be utilized for the functionality of generating the encrypted information using private keys. The device configurations can include datacenter devices, server devices, security devices, other types of devices, and any combination thereof. The private keys can be private RSA keys in a variety of bit sizes including but not limited to 40, 512, and 2048 bit sizes. Increasing the private key size to 2048 bits requires the increasing of the associated password bit size as well which can create various system constraints. As a result, the private keys can also be 224 bit elliptic curve digital signature algorithm (ECDSA) private keys which are approximately the same size as 2048 bit private RSA keys but do not require corresponding increases to password bit sizes.

The private key that is utilized to encrypt the information can be stored in the security device (e.g., a SafeNet device) and can be non-exportable as aforementioned which can prevent former and current users (e.g., employees) from garnering its value. The corresponding public key can be generated and stored within the security device or immediately transmitted to the instance when the encrypted information is also generated using the private key. In some implementations, the server device of the authentication system can comprise both a HiHop datacenter device (e.g., a customer service instance designed to process requests for encrypted information) and an Elrond server device (e.g., a server device designed to securely provide encrypted information in response to requests for encrypted information). The Elrond server device can be granted the only or sole ability to submit encryption requests to the security device. In other implementations, the server device comprises only a HiHop datacenter device (or another type of datacenter device) that can submit the encryption requests directly to the security device (i.e., without the usage of an Elrond server or similar type of server device). The security device credentials can be partially or completely encrypted and can be stored securely on either the Elrond server or the HiHop datacenter device or another device of the authentication system (e.g., a database) so that the client device does not have access to the security device credentials and must submit the access requests via the authentication system. The authentication system can allow for key rotation and replacement for both private and public keys utilized by the security device.

The communication flow between the client device, the authentication system, and the instance related to the authentication process can take a variety of forms. For example, the client device can submit an access request (e.g., a request to access an instance) via a web browser (of either the client device or the instance or the authentication system) or a security dashboard of the instance; the access request can be received by a datacenter device (e.g., HiHop) that authenticates the client device and then generates and submits an encryption request for the encryption of information to a server device (e.g., Elrond server); the server device can generate the encrypted information using a private key and can send the encrypted information back to the client device via the datacenter device or directly by the server device; the client device can submit the encrypted information to the instance to garner access; and the instance can grant the access in response to successfully decrypting the encrypted information using a public key associated with the private key used by the server device.

In another example, the client device can submit an access request (e.g., a request to access an instance) via a web browser (of either the client device or the instance or the authentication system) or a security dashboard of the instance; the access request can be received by a datacenter device (e.g., HiHop) that authenticates the client device and then generates and submits an encryption request of information to a server device (e.g., Elrond server); the server device can connect to a security device (e.g., SafeNet module/device) and forward the encryption request to the security device; the security device can generate the encrypted information using a private key and can send the encrypted information back to the client device via either both the datacenter device and the server device, either only the datacenter device or only the server device, or directly by the security device; the client device can submit the encrypted information to the instance to garner access; and the instance can grant the access in response to successfully decrypting the encrypted information using a public key associated with the private key used by the security device.

In another example, the client device can submit an access request (e.g., a request to access an instance) via a web browser (of either the client device or the instance or the authentication system) or a security dashboard of the instance; the access request can be received by a datacenter device (e.g., HiHop) that authenticates the client device and then generates and submits an encryption request of information to a security device (e.g., SafeNet module/device); the security device can generate the encrypted information using a private key and can send the encrypted information back to the client device via the datacenter device or directly by the security device; the client device can submit the encrypted information to the instance to garner access; and the instance can grant the access in response to successfully decrypting the encrypted information using a public key associated with the private key used by the security device.

Implementations of this disclosure provide technological improvements particular to computer networks, for example, those concerning the authentication of access to an instance. Computer network-specific technological problems, such as authenticating access to an instance for a user or client device by generating encrypted information using a variety of private key types and by communicating the encrypted information back to the user or client device to provide the access via a variety of communication channels, can be wholly or partially solved by implementations of this disclosure. For example, information associated with an access request submitted by a client device including but not limited to a client device username, an instance identification value, and an expiration time may be leveraged for authenticating access to an instance by the client device in a more cost-effective, efficient, and streamlined manner. Implementations of this disclosure can thus introduce new and efficient improvements in the ways in which access to an instance related to computer-networks and cloud computing systems, is authenticated by encrypting information associated with at least the access request.

Figure 2:
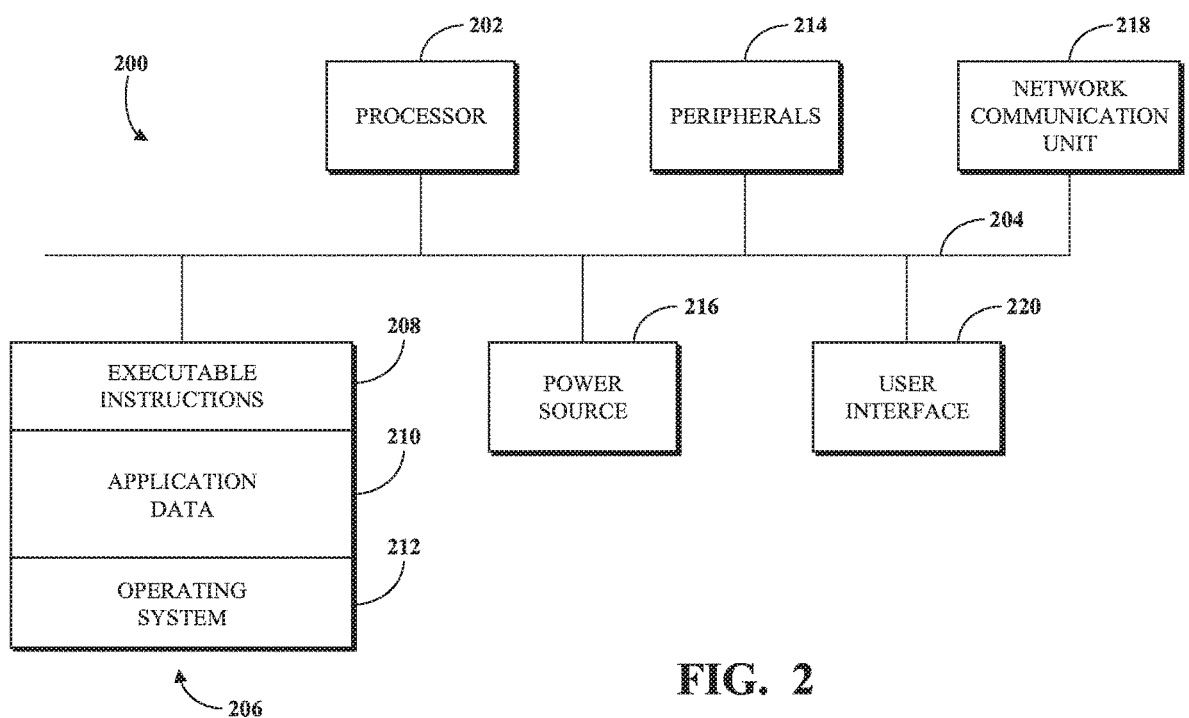
FIG. 2 is a block diagram illustrating an example internal configuration of a computing device of an electronic computing and communications system.

As used herein, the term "component" can refer to a hardware component (e.g., infrastructure, such as a switch, router, server, modem, processor, I/O interface, memory or storage, power supply, biometric reader, media reader, or the like, or combinations thereof) or a software component (e.g., software, such as a platform application, module, routine, firmware process, or other instructions executable by or in connection with one or more hardware components, or the like, or combinations thereof). A component can also refer to a computing feature such as a document, model, plan, socket, virtual machine, or the like, or combinations thereof. A component, such as a hardware component or a software component, can refer to a physical implementation (e.g., a computing device, such as shown in FIG. 2) or a virtual implementation (e.g., a virtual machine, container, or the like that can, for example, execute on a physical device and mimic certain characteristics of a physical device) of one or more of the foregoing. The terms "database" and "database node" may be interchangeably used herein to refer to a data structure for storing data associated with software, such as application software executing on one or more application nodes.

To describe some implementations in greater detail, reference is first made to examples of hardware structures. FIG. 1 is a block diagram illustrating an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as a database 118, which can be accessible by software executed on the application node 114. The database 118 may be implemented as a relational database management system (RDBMS), an object database, an XML database, a CMDB, a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, an access table configured to allow or deny requests to access components of the system 100 can be implemented on the application server 112, the database server 116, or the load balancer 110. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

FIG. 2 is a block diagram illustrating an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to generate records indicating that at least some of the application nodes within a distributed computing system (e.g., the system 100 shown in FIG. 1) are authorized to access at least some of the database nodes of the distributed computing system, store the records in an access table, receive a request to access a database node sent from an application node, determine whether the access table includes a record indicating that the application node is authorized to access the database node, and deny the request responsive to a determination that the access table does not include such a record.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

As aforementioned, a system for identifying resolutions associated with instance incidents is provided. Once an incident occurs, reproducing the actions and/or steps that were taken leading up to the incident can help provide data and information that can be utilized towards identifying resolutions for the incident.

Figure 3:
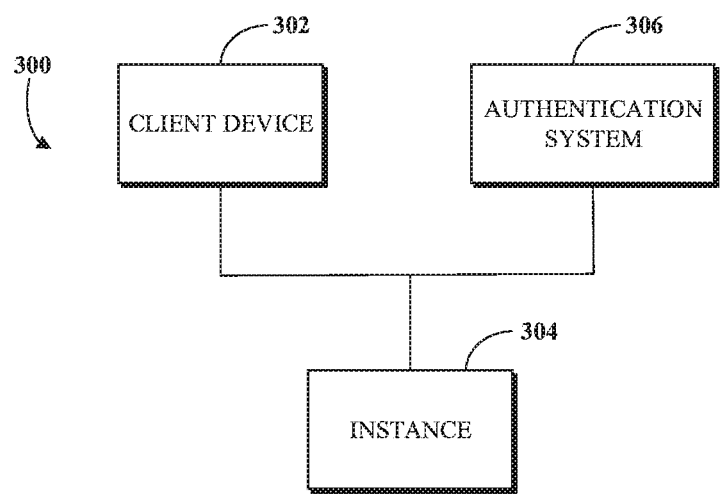
FIG. 3 is a block diagram illustrating an example environment for authenticating access to an instance in accordance with implementations of this disclosure.

FIG. 3 is a block diagram illustrating an example environment 300 for authenticating access to an instance in accordance with implementations of this disclosure. The environment 300 includes a client device 302 (e.g., a user), an instance 304 (e.g., a customer instance), and an authentication system 306 (e.g., a cloud computing infrastructure) that authenticates the access to the instance 304. In response to the client device 302 requesting access to the instance 304, the authentication system 306 determines whether the client device 302 should be granted access to the instance 304 by authenticating the access request submitted by the client device 302. In some implementations, the authentication system 306 includes a server device, such as the datacenter 108 of FIG. 1 or the computing device 200 of FIG. 2, that includes a memory, a processor, and a network interface, wherein the memory includes instructions executable by the processor to implement the sub-systems of the authentication system 306. In some implementations, the authentication system 306 includes a memory and a processor, wherein the memory includes instructions executable by the processor to authenticate the access to the instance 304 by the client device 302. In some implementations, the authentication system 306 is integrated within and part of the instance 304.

In some implementations, the authentication system 306 includes any combination of one or more datacenter devices (e.g., HiHop datacenter devices), server devices (e.g., Elrond server devices), and security devices (e.g., SafeNet modules/devices). For example, the authentication system 306 can include a datacenter device and a server device; a datacenter device, a server device, and a security device; or a datacenter device and a security device. The client device 302 submits a request to access the instance 304. In response to the request to access the instance 304, the authentication system 306 authenticates the request by sending encrypted information back to the client device 302 for usage in accessing the instance 304.

The encrypted information can be encrypted using a private key by the authentication system 306. Once the client device 302 receives the encrypted information from the authentication system 306, the client device 302 can provide the encrypted information to the instance 304 to obtain access to the instance 304. The instance will provide access to the client device 302 after using a public key associated with the private key to decrypt the encrypted information submitted by the client device 302 and optionally verifying information decrypted from the encrypted information. For example, a decrypted expiration time or date can be compared to a current time or date to verify that the current time or date is not later than the expiration time or date. Other information may also be verified (e.g., an identification of the instance being accessed). If the public key does not properly decrypt the encrypted information or if the decrypted information is not verified, then the client device 302 can be denied access to the instance 304.

The client device 302 can submit the request to access the instance 304 via a web browser interface or a display associated with the instance 304. The display can generate a graphical user interface (or a portion thereof) constituting data that reflects information ultimately destined for display on a hardware device, such as the client 104 of FIG. 1. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

The authentication system 306 that is communication with the client device and receives the access requests can comprise any combination of datacenter devices, server devices, and security devices that result in a variety of platform designs. For example, in a first configuration, the authentication system 306 can comprise a datacenter device (e.g., HiHop) coupled to a server device (e.g., Elrond); in a second configuration, the authentication system 306 can comprise a datacenter device (e.g., HiHop) coupled to a server device (e.g., Elrond) that is coupled to a security device (e.g., SafeNet); and in a third configuration, the authentication system 306 can comprise a datacenter device (e.g., HiHop) coupled directly to the security device (e.g., SafeNet) without the presence of an intermediary server device.

If the authentication system 306 is in the first configuration that comprises a datacenter device in communication with a server device such as an Elrond server that is in charge of generating encrypted information that is used by the client device to access the instance (so there is no security device), the server device can be used only for keys such as the private RSA 40 bit and 512 bit keys. The elliptic curve digital signature algorithm (ECDSA) private key with 224 bit size can be utilized in an authentication system 306 that is in the third configuration that includes a datacenter device in communication directly with a security device (so there is no server device such as an Elrond server). In the third configuration, the datacenter device may be upgraded to support communications with security devices such as SafeNet devices.

If the authentication system 306 is in the second configuration that comprises a datacenter device in communication with a server device that is in communication with a security device, the server device or Elrond server may be rebuilt to garner functionality from a cryptographic package or application programming interface (API) (e.g., glide.communications.crypto) where code changes may be expected including but not limited to communications and calls to the security or SafeNet device. A new JAR (Java ARchive) can be deployed to several server devices while ensuring functionality of the Elrond server in the first configuration is maintained. A configuration (e.g., glide.safenet.properties file) that includes a variety of information including but not limited to the client device username (uid), the generated encrypted information, and the corresponding private and public key names can also be deployed in the second configuration for the security or SafeNet device.

If the authentication system 306 is in the third configuration that comprises a datacenter device in communication with a security device that is in charge of generating the encrypted information used by the client device to access the instance, the security device can be a SafeNet device with hardware/software that provides setup, configuration, generation of the private key and the public key, and exporting of the public key to the instance for decryption. The security device can create a configuration (e.g., glide.safenet.properties file) that includes a variety of information including but not limited to the client device username (uid), the generated encrypted information, and the corresponding private and public key names.

To differentiate from the functionality of the Elrond server in the first configuration, a special key can be created or utilized for usage by the Elrond server in the second configuration (whereas a regular key can be created or utilized for usage by the Elrond server in the first configuration). The special key can be associated with a new start date (e.g., in a YYYY-MM-DD format or a different date format) that will signal that the Elrond server should communicate with the security or SafeNet device for the generation of the encrypted information as opposed to generating the encrypted information itself (as it would in the first configuration). In some implementations, APIs, (e.g., credentials.java) could be updated which would require code changes in Elrond server and an upgrade to the HiHop datacenter device. The HiHop datacenter device and their client-handling tools can have modifications made to their scripts to map the latest versions to provide functionality with the ECDSA private key. Alternatively, new scriptable APIs can be added to a GlideCredentials package which may require upgrades to the instances.

The cryptographic package (e.g., com.glide.communications.crypto) and other Java source code associated with either the datacenter and server devices can be updated to add functionality for communications with the security device (e.g., SafeNet) when the authentication system 306 utilizes the second or third configurations. The updates can include but are not limited to functionality comprising reading properties files, connecting and creating sessions, signing the requests (or encrypting the information), adding certificates for the SafeNet, and adding SafeNet libraries. In addition, the public key can be included into the configuration by being hard-coded, defined in a separate properties file to support key rotation, or via multiple keys to enable usage of 3-char prefixes with key name's hashcode.

The update to the crednetials.java API can include a variety of updates including but not limited to implementing support for encryption of information using a ECDSA private key via the security or SafeNet device. The ECDSA private key can be stored in SafeNet with its value utilized explicitly for the encryption. The updates can also include implementing decryption with the public key (associated with the private key) using ECDSA, utilizing base64 encoding instead of base94 encoding for the ECDSA keys, and supporting the non-ECDSA keys (e.g., private RSA keys of 40 and 512 bit size) in parallel or providing for a transitional period where both types of keys are supported. A UserAuthenticatorTimeLimited.java API can be updated to support fetching the ECDSA keys if they are placed into a different location from a current location (e.g., customer_logon_public.key location).

In response to receiving an access request from the client device, the HiHop datacenter device can generate or set a RequestCredentials request (i.e., an encryption request of information that includes but is not limited to username, instance ID, adjusted build-version information, etc.) and can send the RequestCredentials request to the Elrond server by, for example, calling RequestCredentials.generate( ). Alternatively, the SafeNet can generate the encrypted information directly without interaction with the Elrond server if, for example, the build-version information matches a predetermined flag or pattern which can be utilized for determining the keys to utilize. For example, if the key is flagged as "regular", then the Elrond server can be utilized in the first configuration to generate the encrypted information but if the key is flagged as "special", then the Elrond server can be utilized in the second configuration to generate the encrypted information.

In both cases, the encrypted information and response is sent back to HiHop and then sent back to the client device. Once the HiHop datacenter receives the encrypted information back from the Elrond server (in either the first or the second configurations) or directly from the SafeNet security device (in the third configuration), the HiHop datacenter can extract credentials or information including but not limited to username, password, and authorized roles. The HiHop datacenter can build a link or token with a URL that contains the extracted information or can display the extracted information to the client device via a redirected page. Once the instance receives the request for access from the client device (e.g., after the user clicks on the link provided by the HiHop or after the user submits the credential information received via another mechanism), the instance can create a call such as UserAuthenticatorTimeLimited.authenticate( ) with the provided encrypted information (which can serve as a password) and can use Credentials.check( ) to verify the encrypted information received. The encrypted information (and any included password) can be verified by decrypting the encrypted information using a public key associated with the private key and comparing the decrypted values to locally-generated values. If a match is found (e.g., a match between the decrypted value based on the encrypted information received from the client device and another value decrypted based on the information received from the security device that did the encryption), then the user can be allowed to access or log into the instance.

Figure 4:
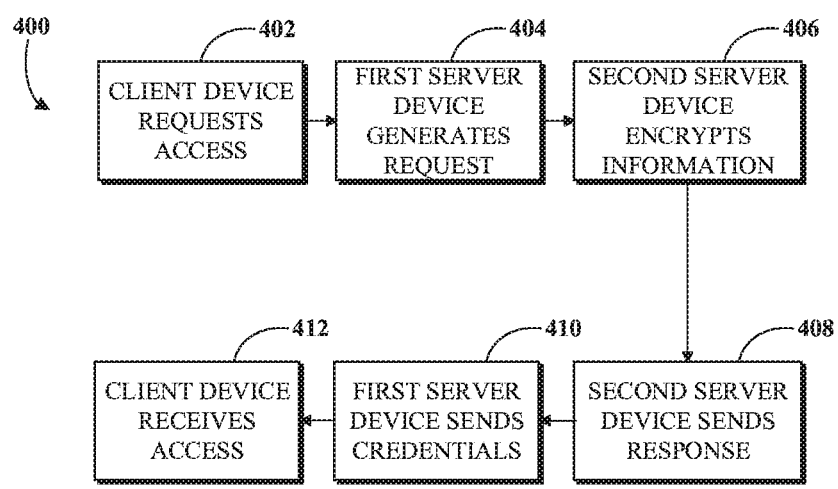
FIG. 4 is a flowchart illustrating a technique for authenticating access to an instance in accordance with implementations of this disclosure.

FIG. 4 is a flowchart illustrating a technique 400 for authenticating access to an instance in accordance with implementations of this disclosure. The technique 400 can be executed using computing devices, such as the systems, modules, and devices described with respect to FIGS. 1-3. The technique 400 can be performed, for example, by executing a machine-readable program or other computer-executable instructions, such as instructions or programs described according to JavaScript, C, or other such instructions. The steps, or operations, of the technique 400 or any other technique, method, process, or algorithm described in connection with the implementations disclosed herein can be implemented directly in hardware, firmware, software executed by hardware, circuitry, or a combination thereof.

The technique 400 can authenticate access to a variety of instances including but not limited to an instance of platform software in a single-tenant or multi-instance cloud computing infrastructure or platform. The technique 400 includes communication and data transfer between a variety of devices including but not limited to a client device, a first server device, and a second server device in the first configuration. The client device can comprise a variety of devices including but not limited to a smartphone and a computing device (e.g., laptop, desktop computer, etc.) that can access a web browser application or a graphical user interface of a security dashboard that is in communication or associated with the instance. The server devices can comprise a variety of devices including but not limited to the first server device being a HiHop datacenter server and the second server device being an Elrond server.

In the technique 400, a client device that is seeking access to an instance can initiate the authentication process by requesting access to the instance, via 402. The access request can be a request for garnering a password or other information (e.g., encrypted information) that would enable the access to the instance. The access request can be submitted via the web browser or security dashboard utilized by the client device or another mechanism including but not limited to sending a short message service (SMS) text message or email message. The access request is received by the first server device or HiHop datacenter server which can generate an encryption request for information, via 404.

The encryption request is a request for the encryption (by the second server device) of information that is sent from the first server device to the second server device. The encryption request can be sent to the second server device by the first server device on behalf of the client device. In addition, the first server device can check or authenticate the access request received from the client device to verify that the access request is being sent from an authorized client device prior to sending the encryption request for the information to the second server device. For example, the first server device can determine whether the client device's username is on a predetermined list of authorized client device usernames.

The encryption request for the information sent by the first server device to the second server device can include a variety of information that includes but is not limited to a client device identification value (e.g., a username of the client device that is requesting access to the instance), an authorization level (e.g., administrative access, user access, ITIL access management levels, etc.), an identification value of the instance (e.g., the identification of the instance that the client device has requested access to), a predetermined time period (e.g., a time period that the request can be valid for such as one week), an expiration timestamp (e.g., a timestamp when the request expires such as a certain date and time), and any combination thereof. The information included within the encryption request can include additional information including but not limited to adjusted build versions and project related information (i.e., project information related to the temporary access that a user is seeking).

After the second server device receives the encryption request for the information from the first server device, the second server device generates the encrypted information, via 406, which can serve as a password for the client device to utilize to garner access to the instance. The encrypted information is generated by retrieving a private key from local storage (of the second server device) and utilizing the private key to generate the encrypted information from the information included in the encryption request that was received from the first server device. In some implementations, the private key can be secured and stored in a remote storage device. The private key can be a variety of types including but not limited to a private RSA key with 40 bit size, a private RSA key with 512 bit size, a private RSA key with 2048 bit size, and an elliptic curve digital signature algorithm (ECDSA) private key with 224 bit size. Once the encrypted information is generated, the second server device sends a response back to the first server device that includes the encrypted information, via 408.

After the first server device receives the response with the encrypted information from the second server device, the first server device generates credentials, via 410, that the client device can utilize to access the instance, via 412. In some implementations, the credentials can include only the encrypted information or can include additional information associated with the client device or the instance in addition to the encrypted information. In some implementations, after receiving the response with the encrypted information from the second server device, the first server device sends the encrypted information directly to the client device so that the client device can use the encrypted information to access the instance. The first server device can also create a uniform resource locator (URL) link or token that includes the encrypted information and any additional information and can send the URL link or token to the client device so that the client device can use the URL link or token to access the instance.

The client device can utilize the encrypted information that has been received (either directly or indirectly via the URL link or token) from the first server device to access the instance via the web browser or another application interface (such as a graphical user interface of a security dashboard associated with the instance). Once the client device submits the encrypted information to the instance, the instance can decrypt the encrypted information using a public key that is associated with the private key. If the encrypted information includes an expiration time, the client device must submit the encrypted information to the instance for access (and decryption by the instance) before the expiration time. The public key can be received by the instance and from the second server device simultaneous to the generation of the encrypted information by the second server device using the private key or at another time. For example, after the client device submits the received encrypted information to the instance for access, the instance can communicate with the second server device regarding the received encrypted information and can receive the public key from the second server device at that time.

Figure 5:
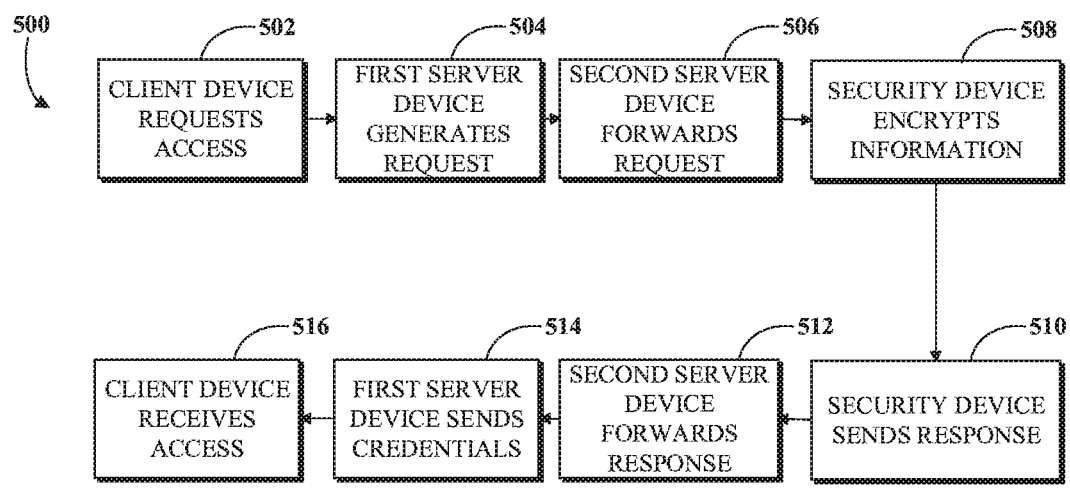
FIG. 5 is a flowchart illustrating a technique for authenticating access to an instance in accordance with implementations of this disclosure.

FIG. 5 is a flowchart illustrating a technique 500 for authenticating access to an instance in accordance with implementations of this disclosure. The technique 500 can be executed using computing devices, such as the systems, modules, and devices described with respect to FIGS. 1-3. The technique 500 can be performed, for example, by executing a machine-readable program or other computer-executable instructions, such as instructions or programs described according to JavaScript, C, or other such instructions. The steps, or operations, of the technique 500 or any other technique, method, process, or algorithm described in connection with the implementations disclosed herein can be implemented directly in hardware, firmware, software executed by hardware, circuitry, or a combination thereof.

The technique 500 can authenticate access to a variety of instances including but not limited to an instance of platform software in a single-tenant or multi-instance cloud computing infrastructure or platform. The technique 500 includes communication and data transfer between a variety of devices including but not limited to a client device, a first server device, a second server device (or agent device), and a security device in the second configuration. The client device can comprise a variety of devices including but not limited to a smartphone and a computing device (e.g., laptop, desktop computer, etc.) that can access a web browser application or graphical user interface of a security dashboard that is in communication or associated with the instance. The server devices can comprise a variety of devices including but not limited to the first server device being a HiHop datacenter server and the second server device being an Elrond server. The security device can comprise a variety of devices including but not limited to a SafeNet hardware security module (HSM).

The technique 500 of FIG. 5 is similar in operation to the technique 400 of FIG. 4 with the addition of the security device and resulting communication flow changes. In the technique 500, a client device that is seeking access to an instance can initiate the authentication process by requesting access to the instance, via 502. The access request can be a request for garnering a password or other information (e.g., encrypted information) that would enable the access to the instance. The access request can be submitted via the web browser or security dashboard utilized by the client device or another mechanism including but not limited to sending a short message service (SMS) text message or email message. The access request is received by the first server device or HiHop datacenter server which can generate an encryption request for information, via 504. The encryption request is received by the second server device or Elrond server which then forwards the encryption request to the security device, via 506. In some implementations, the first server device can forward the access request received from the client device to the second server device for generation of the encryption request by the second server device which then sends the encryption request to the security device.

The encryption request is a request for the encryption (by the security device) of information that is received by the security device. The encryption request can be sent to the security device either by the first server device (and via the second server device) on behalf of the client device or by the second server device on behalf of the client device. In addition, the first server device can check or authenticate the access request received from the client device to verify that the access request is being sent from an authorized client device prior to generating the encryption request for the information and sending the encryption request to the second server device or prior to sending the access request to the second server device that generates the encryption request. For example, the first server device can determine whether the client device's username is on a predetermined list of authorized client device usernames.

The encryption request for the information received by the security device can include a variety of information that includes but is not limited to a client device identification value (e.g., a username of the client device that is requesting access to the instance), an authorization level (e.g., administrative access, user access, ITIL access management levels, etc.), an identification value of the instance (e.g., the identification of the instance that the client device has requested access to), a predetermined time period (e.g., a time period that the request can be valid for such as one week), an expiration timestamp (e.g., a timestamp when the request expires such as a certain date and time), and any combination thereof. The information included within the encryption request can include additional information including but not limited to adjusted build versions and project related information (i.e., project information related to the temporary access that a user is seeking).

After the security device receives the encryption request for the information from the second server device, the security device generates the encrypted information, via 508, which can serve as a password for the client device to utilize to garner access to the instance. The encrypted information is generated by retrieving a private key from local storage (of the security device) and utilizing the private key to generate the encrypted information from the information included in the encryption request that was received from the second server device. In some implementations, the private key can be secured and stored in a remote storage device. The private key can be a variety of types including but not limited to a private RSA key with 40 bit size, a private RSA key with 512 bit size, a private RSA key with 2048 bit size, and an elliptic curve digital signature algorithm (ECDSA) private key with 224 bit size. Once the encrypted information is generated, the security device sends a response back to the second server device that includes the encrypted information, via 510.

After the second server device receives the response with the encrypted information from the security device, the second server device can forward the response to the first server device, via 512. The first server device can generate credentials, via 514, that the client device can utilize to access the instance, via 516. In some implementations, the credentials can include only the encrypted information or can include additional information associated with the client device or the instance in addition to the encrypted information. In some implementations, after receiving the response with the encrypted information from the security device via the second server device, the first server device sends the encrypted information directly to the client device so that the client device can use the encrypted information to access the instance. The first server device can also create a uniform resource locator (URL) link or token that includes the encrypted information and any additional information and can send the URL link or token to the client device so that the client device can use the URL link or token to access the instance.

The client device can utilize the encrypted information that has been received (either directly or indirectly via the URL link or token) from the first server device to access the instance via the web browser or another application interface (such as a graphical user interface of a security dashboard associated with the instance). Once the client device submits the encrypted information to the instance, the instance can decrypt the encrypted information using a public key that is associated with the private key. If the encrypted information includes an expiration time, the client device must submit the encrypted information to the instance for access (and decryption by the instance) before the expiration time. The public key can be received by the instance and from the security device simultaneous to the generation of the encrypted information by the security device using the private key or at another time. For example, after the client device submits the received encrypted information to the instance for access, the instance can communicate with the security device regarding the received encrypted information and can receive the public key from the security device at that time.

Figure 6:
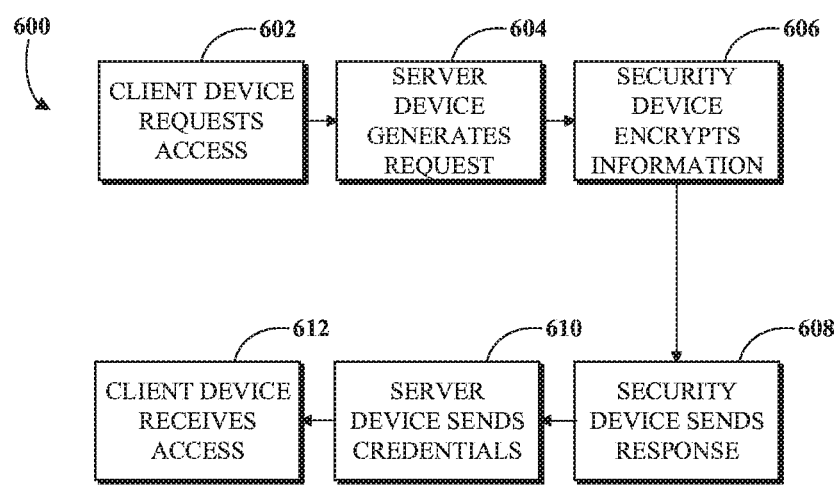
FIG. 6 is a flowchart illustrating a technique for authenticating access to an instance in accordance with implementations of this disclosure.

FIG. 6 is a flowchart illustrating a technique 600 for authenticating access to an instance in accordance with implementations of this disclosure. The technique 600 can be executed using computing devices, such as the systems, modules, and devices described with respect to FIGS. 1-3. The technique 600 can be performed, for example, by executing a machine-readable program or other computer-executable instructions, such as instructions or programs described according to JavaScript, C, or other such instructions. The steps, or operations, of the technique 600 or any other technique, method, process, or algorithm described in connection with the implementations disclosed herein can be implemented directly in hardware, firmware, software executed by hardware, circuitry, or a combination thereof.

The technique 600 can authenticate access to a variety of instances including but not limited to an instance of platform software in a single-tenant or multi-instance cloud computing infrastructure or platform. The technique 600 includes communication and data transfer between a variety of devices including but not limited to a client device, a server device, and a security device in the third configuration. The client device can comprise a variety of devices including but not limited to a smartphone and a computing device (e.g., laptop, desktop computer, etc.) that can access a web browser application or graphical user interface of a security dashboard that is in communication or associated with the instance. The server device can comprise a variety of devices including but not limited to a HiHop datacenter server. The security device can comprise a variety of devices including but not limited to a SafeNet hardware security module (HSM).

The technique 600 of FIG. 6 is similar in operation to the technique 400 of FIG. 4 with the substitution of the security device as the second server device (so there is a client device, a server device, and a security device in communication with each other) and resulting communication flow changes. In the technique 600, a client device that is seeking access to an instance can initiate the authentication process by requesting access to the instance, via 602. The access request can be a request for garnering a password or other information (e.g., encrypted information) that would enable the access to the instance. The access request can be submitted via the web browser or security dashboard utilized by the client device or another mechanism including but not limited to sending a short message service (SMS) text message or email message. The access request is received by the server device or HiHop datacenter server which can generate an encryption request for information, via 604. The encryption request is a request for the encryption (by the security device) of information that is received by the security device.

In addition, the server device can check or authenticate the access request received from the client device to verify that the access request is being sent from an authorized client device prior to generating the encryption request for the information and sending the encryption request to the security device. For example, the server device can determine whether the client device's username is on a predetermined list of authorized client device usernames.

The encryption request for the information received by the security device can include a variety of information that includes but is not limited to a client device identification value (e.g., a username of the client device that is requesting access to the instance), an authorization level (e.g., administrative access, user access, ITIL access management levels, etc.), an identification value of the instance (e.g., the identification of the instance that the client device has requested access to), a predetermined time period (e.g., a time period that the request can be valid for such as one week), an expiration timestamp (e.g., a timestamp when the request expires such as a certain date and time), and any combination thereof. The information included within the encryption request can include additional information including but not limited to adjusted build versions and project related information (i.e., project information related to the temporary access that a user is seeking).

After the security device receives the encryption request for the information from the server device, the security device generates the encrypted information, via 606, which can serve as a password for the client device to utilize to garner access to the instance. The encrypted information is generated by retrieving a private key from local storage (of the security device) and utilizing the private key to generate the encrypted information from the information included in the encryption request that was received from the server device. In some implementations, the private key can be secured and stored in a remote storage device. The private key can be a variety of types including but not limited to a private RSA key with 40 bit size, a private RSA key with 512 bit size, a private RSA key with 2048 bit size, and an elliptic curve digital signature algorithm (ECDSA) private key with 224 bit size. Once the encrypted information is generated, the security device sends a response back to the server device that includes the encrypted information, via 608.

After the server device receives the response with the encrypted information from the security device, the server device can generate credentials, via 610, that the client device can utilize to access the instance, via 612. In some implementations, the credentials can include only the encrypted information or can include additional information associated with the client device or the instance in addition to the encrypted information. In some implementations, after receiving the response with the encrypted information from the security device, the server device sends the encrypted information directly to the client device so that the client device can use the encrypted information to access the instance. The server device can also create a uniform resource locator (URL) link or token that includes the encrypted information and any additional information and can send the URL link or token to the client device so that the client device can use the URL link or token to access the instance.

The client device can utilize the encrypted information that has been received (either directly or indirectly via the URL link or token) from the server device to access the instance via the web browser or another application interface (such as a graphical user interface of a security dashboard associated with the instance). Once the client device submits the encrypted information to the instance, the instance can decrypt the encrypted information using a public key that is associated with the private key. If the encrypted information includes an expiration time, the client device must submit the encrypted information to the instance for access (and decryption by the instance) before the expiration time. The public key can be received by the instance and from the security device simultaneous to the generation of the encrypted information by the security device using the private key or at another time. For example, after the client device submits the received encrypted information to the instance for access, the instance can communicate with the security device regarding the received encrypted information and can receive the public key from the security device at that time.

Figure 7:
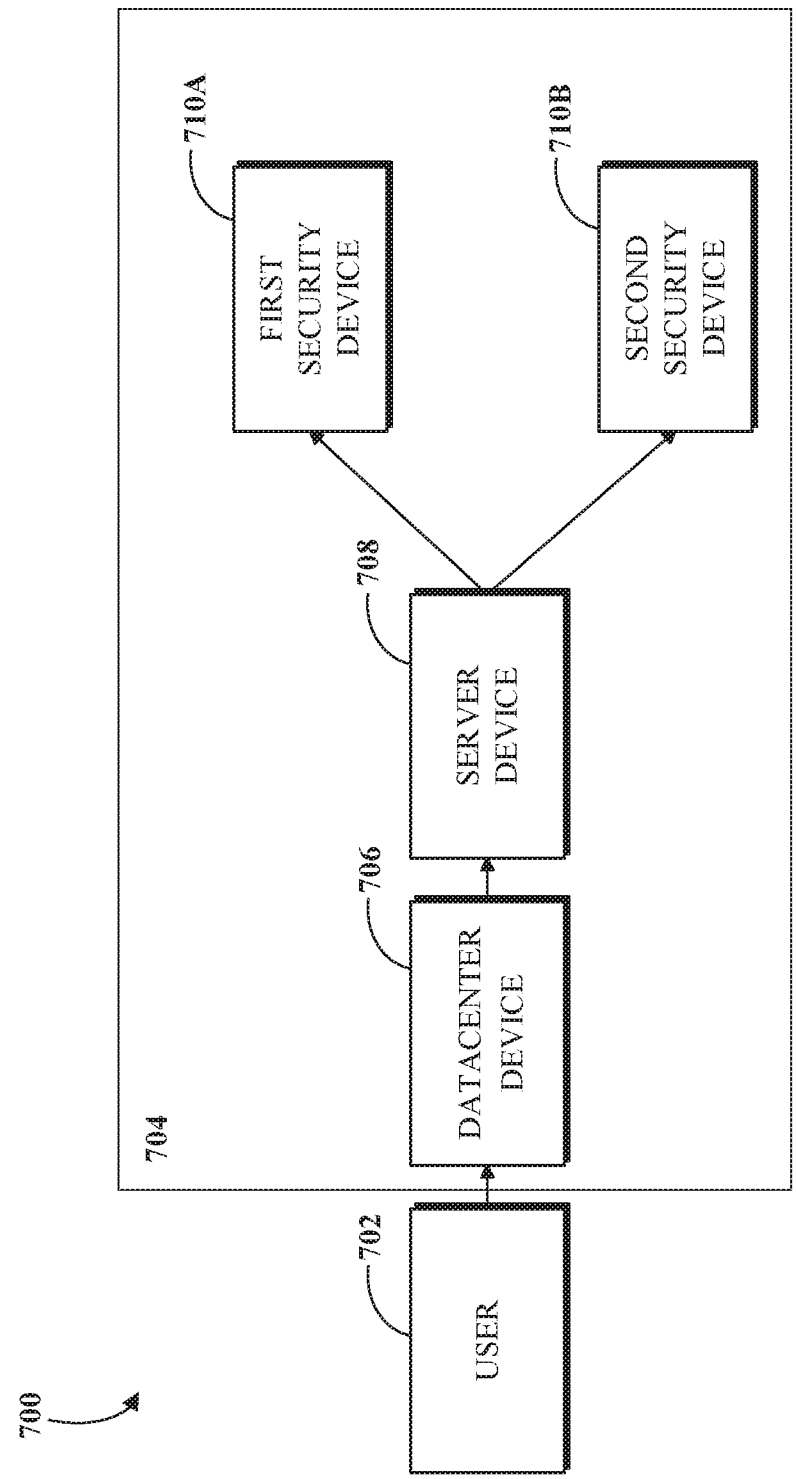
FIG. 7 is a block diagram illustrating an example system for authenticating access to an instance in accordance with implementations of this disclosure.

FIG. 7 is a block diagram illustrating an example system 700 for authenticating access to an instance in accordance with implementations of this disclosure. The system 700 includes a user 702 in communication with or connected to a cloud computing infrastructure 704. The communication can be facilitated via a variety of mechanisms including but not limited to via a web browser of the user 702 or via a graphical user interface of a security dashboard of the instance. The user 702 can be a client device (e.g., smartphone, laptop, desktop computer, etc.) that is requesting access to an instance (not shown) from the cloud computing infrastructure 704 that authenticates the access in response to the request from the user 702. In FIG. 7, the cloud computing infrastructure 704 includes a datacenter device 706, a server device 708, a first security device 710A, and a second security device 710B. The user 702 can interface and be in communication with the datacenter device 706, the datacenter device 706 can interface and be in communication with the server device 708, and the server device 708 can interface and be in communication with the first and the second security devices 710A-B.

In some implementations, the cloud computing infrastructure 704 can include only the datacenter device 706 and the first and second security devices 710A-B. Therefore, the datacenter device 706 can directly interface and be in communication with both the user 702 and the first and the second security devices 710A-B. The cloud computing infrastructure 704 can also include varying numbers of security devices including but not limited to only one security device or more than two security devices. In some implementations, the plurality of security devices (e.g., the first and second security devices 710A-B or the more than two security devices) can be in a high availability (HA) environment with each other. The HA environment enables multiple security devices to be grouped together to form a singular security device that can respond to received requests. The datacenter device 706 can comprise a HiHop datacenter device, the server device 708 can comprise an Elrond server device, and the first and second security devices 710A-B can comprise SafeNet security devices.

After the user 702 submits a request to access an instance (i.e., requests a password or other information to utilize to access the instance), the datacenter device 706 can forward the access request to the server device 708. After receiving the access request from the datacenter device 706, the server device 708 can generate and send an encryption request of information (e.g., username of the user 702, ID of the instance, expiration time, etc.) to either the first or the second security devices 710A-B individually or collectively if they are in a HA environment. After receiving the encryption request, the first or the second security device 710A-B (e.g., whichever one has bandwidth to carry out the encryption request or is not currently offline or busy) can generate the encrypted information using a private key (e.g., a 224 bit elliptic curve digital signature algorithm (ECDSA) private key that is non-exportable from the respective security device 710A-B). The encrypted information can be sent back to the user 702 (via both the server device 708 and the datacenter device 706) for usage as the password in accessing the instance or the encrypted information can include a password that when decrypted by the instance provides the access to the user 702. Once submitted by the user 702, the encrypted information is decrypted by the instance using a public key that is associated with the private key to provide the user 702 with the access to the instance. The instance may verify information (e.g., expiration time requirements have been met) that has been decrypted prior to permitting the user 702 to access the instance.

If the cloud computing infrastructure 704 does not include the server device 708, then the datacenter device 706 can generate and send the encryption request to either the first or the second security devices 710A-B individually or collectively if they are in a HA environment. Once the encrypted information is generated by either the first or the second security device 710A-B and received back by the datacenter device 706, the datacenter device 706 can send the encrypted information directly back to the user 702. The datacenter device 706 can also create a URL link or token that includes at least the encrypted information and can send the URL link or token to the user 702 for usage as the password in accessing the instance. The encrypted information is once again decrypted by the instance using the public key that is associated with the private key to provide the user 702 with the access to the instance. The instance may verify information (e.g., expiration time requirements have been met) that has been decrypted prior to permitting the user 702 to access the instance.

Figure 8:
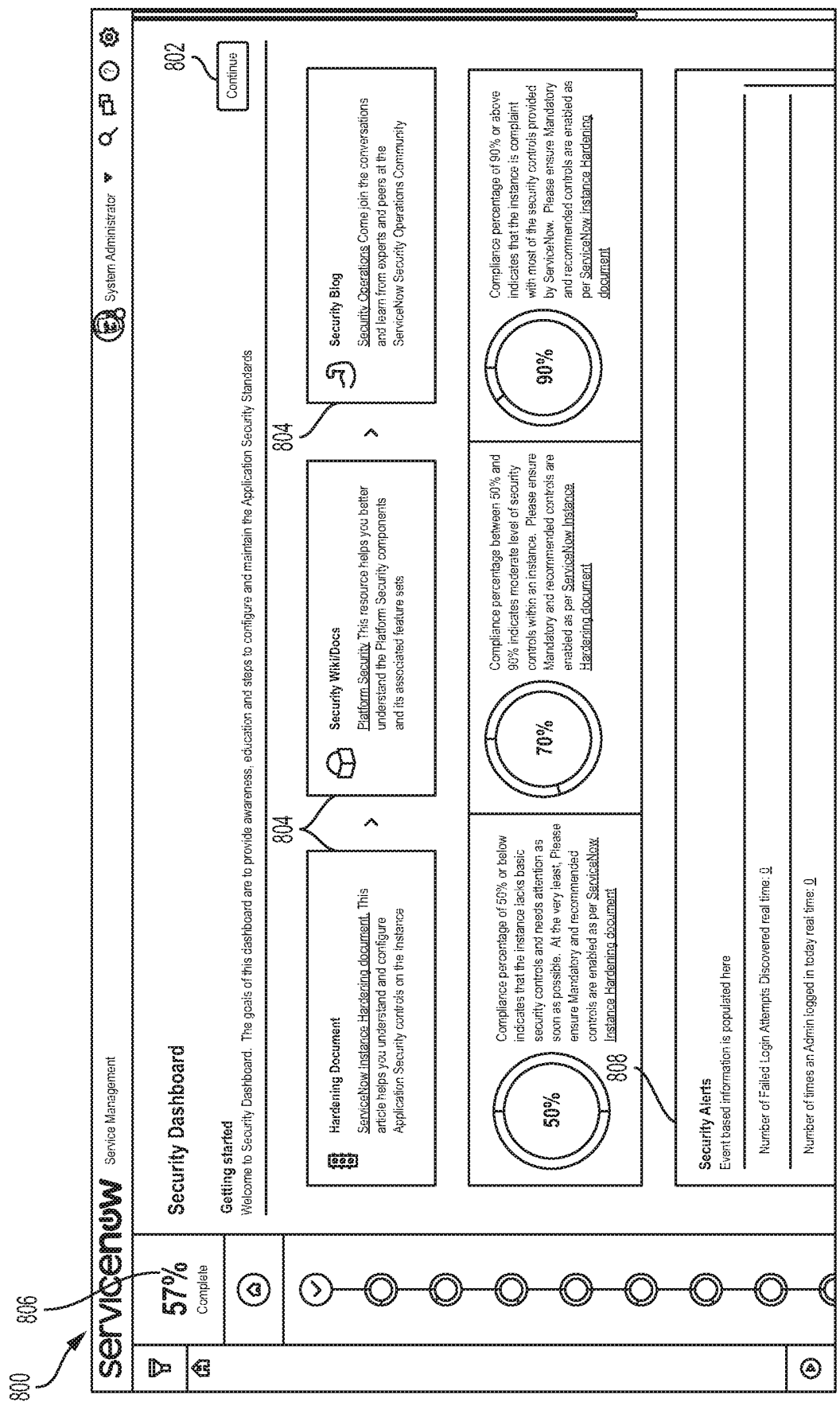
FIG. 8 is a screenshot illustrating a graphical user interface of a security dashboard of a client device in accordance with implementations of this disclosure.

FIG. 8 is a screenshot illustrating a graphical user interface 800 of a security dashboard in accordance with implementations of this disclosure. The graphical user interface 800 of the security dashboard can be executed using computing devices, such as the systems, modules, and devices described with respect to FIGS. 1-3. For example, the security dashboard can be associated with or part of the instance 304 or the authentication system 306 of FIG. 3. The graphical user interface 800 of the security dashboard can be utilized by a system administrator of an instance, such as a customer instance, to manage client device requests for access to the instance. The operator of the client device (i.e., a user) can also utilize the graphical user interface 800 of the security dashboard to request access to a specific instance or to a plurality of instances if the security dashboard is used to manage access to the plurality of instances. For example, once the security settings of the instance have been set (e.g., by a system administrator during the initialization or updating of the instance), all client device requests for access to the instance (and their authentication) can be facilitated via the security dashboard.

After the request to access an instance has been submitted by the client device via the security dashboard, the request can be authenticated via a technique such as the techniques 400, 500, 600, 900 and 1000 of FIGS. 4, 5, 6, 9, and 10 respectively or any other method, process, technique described by the present disclosure. In some implementations, the client device request can be submitted via the graphical user interface 800 of the security dashboard by following a cascade or series of instance access setup instructions initiated by clicking a button such as the button 802. In addition to the managing and authenticating access to either a single instance or a plurality of instances via implementations of this disclosure, the security dashboard can also include additional metrics of the overall security settings of the instance(s) being managed. For example, the security dashboard can include various documentation 804 (or links to the documentation that is externally stored) associated with security of the instance including but not limited to hardening documents, security wiki pages or documents, and security blogs and information.

The security dashboard can also display an indication of a compliance percentage 806 associated with security controls of the instance. For example, a red or 50% compliance percentage indication can indicate that the instance lacks basic security controls (including but not limited to authenticating access to the instance via implementations of this disclosure) and needs attention as soon as possible. The basic security controls can include enabling mandatory and recommended controls that are included in the hardening documents and displayed via the security dashboard. An orange or 50-90% compliance percentage indication can indicate a moderate level of security controls within the instance. The moderate level can indicate that all mandatory controls have been enabled but some of the recommended controls are still required to garner a green or 90-100% compliance percentage indication. The green or 90-100% compliance percentage indication can indicate that the instance is compliant with most of the security controls provided via the security dashboard. The security dashboard can also display security alerts 808 which comprise event based information including but not limited to the number of failed login attempts (i.e., failed logins by client devices seeking access to an instance), the number of times an administrator logged into the instance over a predetermined time period (e.g., today, last week, last month, etc.), and the number of times a particular client device has garnered successful access to a particular instance.

Figure 9:
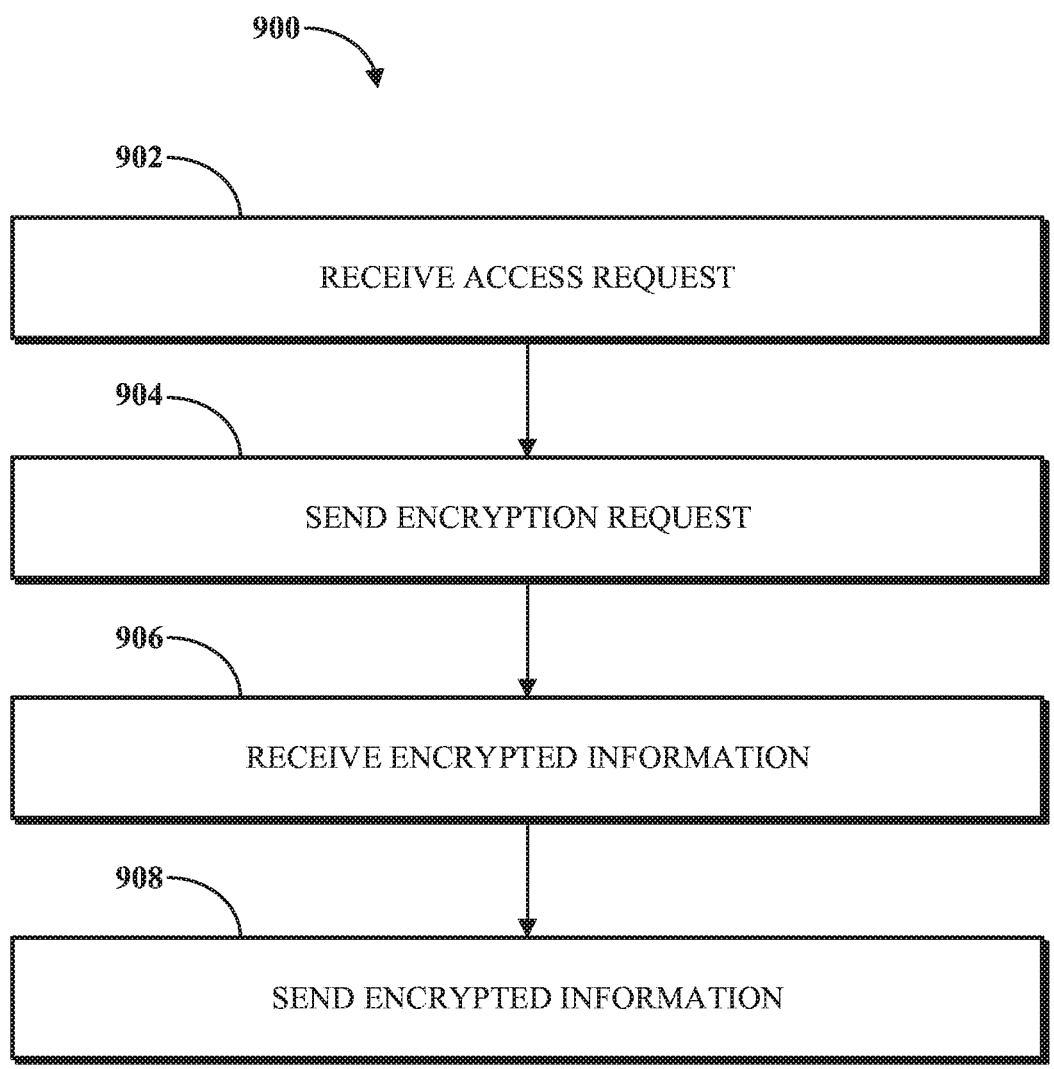
FIG. 9 is a flowchart illustrating an example of a technique for authenticating access to an instance in accordance with implementations of this disclosure.

FIG. 9 is a flowchart illustrating an example of a technique 900 for authenticating access to an instance in accordance with implementations of this disclosure. The technique 900 can be executed using computing devices, such as the systems, modules, and devices described with respect to FIGS. 1-3. The technique 900 can be performed, for example, by executing a machine-readable program or other computer-executable instructions, such as instructions or programs described according to JavaScript, C, or other such instructions. The steps, or operations, of the technique 900 or any other technique, method, process, or algorithm described in connection with the implementations disclosed herein can be implemented directly in hardware, firmware, software executed by hardware, circuitry, or a combination thereof.

The technique 900 can authenticate access to a variety of instances including but not limited to an instance of platform software in a single-tenant or multi-instance cloud computing infrastructure or platform. The technique 900 includes receiving an access request, via 902, sending an encryption request, via 904, receiving encrypted information, via 906, and sending encrypted information, via 908. The access request can be received by a server device from a client device that wants access to an instance. The encryption request can be sent from the server device to a security device that can encrypt information (including but not limited to credential information) that can be utilized by the client device to access the instance. Once the encrypted information is received by the server device from the security device, the encrypted information can be sent by the server device to the client device to access the instance. The encrypted information can include the credential information which can be utilized by the instance to verify that the client device requested access is authorized to garner such access.

Figure 10:
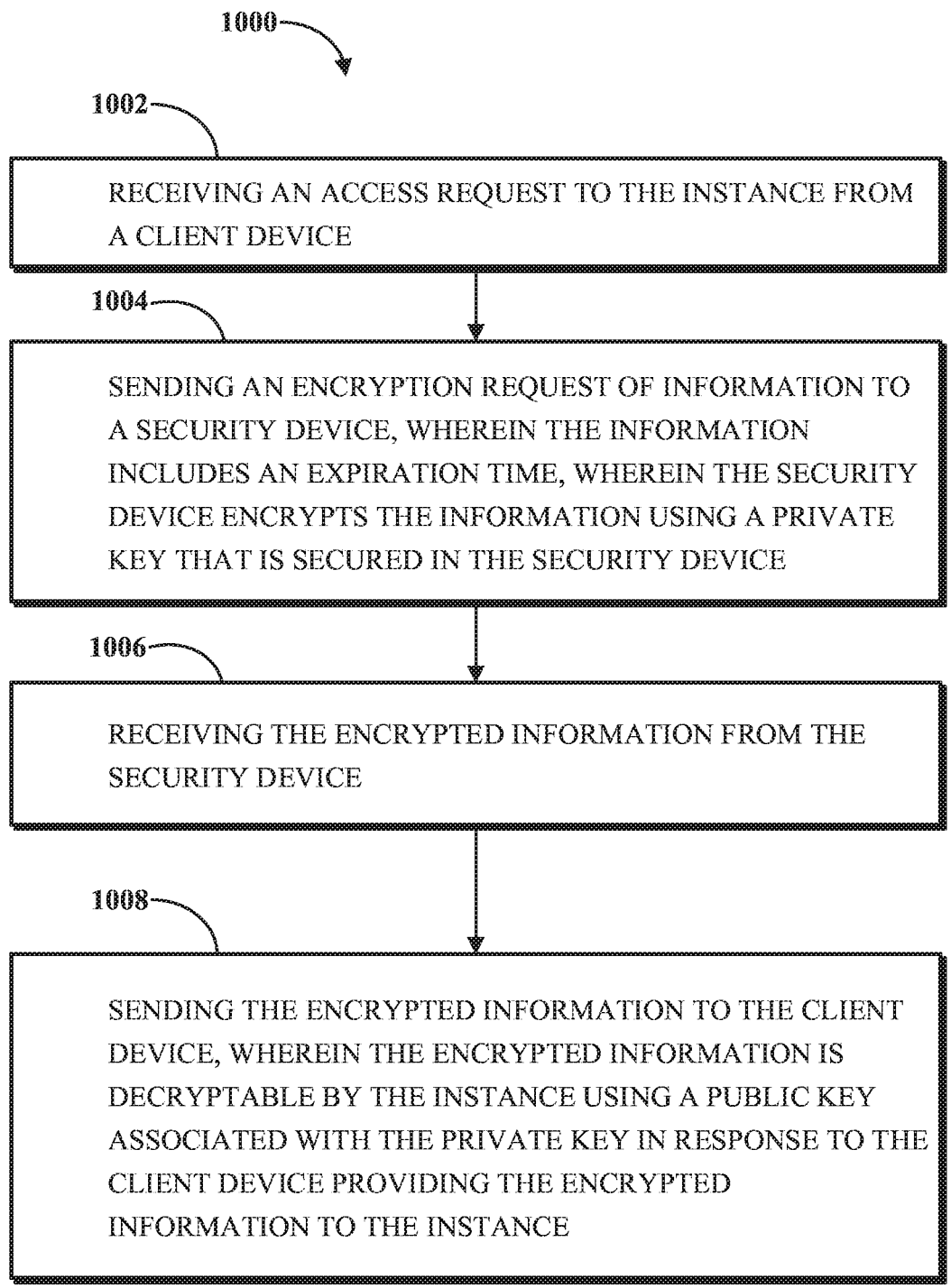
FIG. 10 is a flowchart illustrating an example of a technique for authenticating access to an instance in accordance with implementations of this disclosure.

FIG. 10 is a flowchart illustrating an example of a technique 1000 for authenticating access to an instance in accordance with implementations of this disclosure. The technique 1000 can be executed using computing devices, such as the systems, modules, and devices described with respect to FIGS. 1-3. The technique 1000 can be performed, for example, by executing a machine-readable program or other computer-executable instructions, such as instructions or programs described according to JavaScript, C, or other such instructions. The steps, or operations, of the technique 1000 or any other technique, method, process, or algorithm described in connection with the implementations disclosed herein can be implemented directly in hardware, firmware, software executed by hardware, circuitry, or a combination thereof.

The technique 1000 can authenticate access to a variety of instances including but not limited to an instance of platform software in a single-tenant or multi-instance cloud computing infrastructure or platform. The technique 1000 includes receiving an access request to the instance from a client device, via 1002, and sending an encryption request of information to a security device, wherein the information includes an expiration time, wherein the security device encrypts the information using a private key that is stored in the security device, via 1004. The technique 1000 further includes receiving the encrypted information from the security device, via 1006, and sending the encrypted information to the client device, wherein the encrypted information is decryptable by the instance using a public key associated with the private key in response to the client device providing the encrypted information to the instance, via 1008.

In some implementations, the technique 1000 can include authenticating the access request before sending the encryption request to the security device. Responsive to receiving the access request from the client device, the technique 1000 can include sending another access request to an agent device (e.g., if the authentication system 306 of FIG. 3 is setup in the second configuration associated with FIG. 5) to send the encryption request to the security device. The sending of the encrypted information to the client device can comprise generating a token (e.g., a URL link) that includes the encrypted information and sending the token to the client device, wherein the token is decryptable by the instance using the public key associated with the private key in response to the client device providing the token to the instance. The information can further include a username of the client device, an authorization level, and an identification value of the instance. The private key can be a 224 bit elliptic curve digital signature algorithm (ECDSA) private key and can be non-exportable from the security device. The instance can authenticate the client device responsive to decrypting the encrypted information and verifying the decrypted information (e.g., determining that a current time is before the expiration time decrypted from the encrypted information). The instance can also authenticate the client device responsive to the decryption of the encrypted information without the verifying of the decrypted information (for example, when there is no decrypted information such as an expiration time to verify). The access request can be generated via a graphical user interface of a security dashboard of the client device.

In some implementations, a system for authenticating access to an instance is provided by the present disclosure. The system can include a processor and a memory coupled to the processor, wherein the memory includes instructions executable by the processor to cause the system to receive an access request to the instance from a client device and to send an encryption request of information to a security device, wherein the information includes an expiration time, wherein the security device encrypts the information using a private key that is secured in the security device. The memory further includes instructions executable by the processor to cause the system to receive the encrypted information from the security device and to send the encrypted information to the client device, wherein the encrypted information is decryptable by the instance using a public key associated with the private key in response to the client device providing the encrypted information to the instance.

In some implementations, the memory can further include instructions executable by the processor to cause the system to authenticate the access request before sending the encryption request to the security device and responsive to receiving the access request from the client device, to send another access request to an agent device (e.g., if the authentication system 306 of FIG. 3 is setup in the second configuration associated with FIG. 5) to send the encryption request to the security device. To send the encrypted information to the client device can comprise to generate a token (e.g., a URL link) that includes the encrypted information and to send the token to the client device, wherein the token is decryptable by the instance using the public key associated with the private key in response to the client device providing the token to the instance. The information can further include a username of the client device, an authorization level, and an identification value of the instance. The private key can be a 224 bit elliptic curve digital signature algorithm (ECDSA) private key and can be non-exportable from the security device. The instance can authenticate the client device responsive to decrypting the encrypted information and verifying the decrypted information (e.g., determining that a current time is before the expiration time decrypted from the encrypted information). The instance can also authenticate the client device responsive to the decryption of the encrypted information without the verifying of the decrypted information (for example, when there is no decrypted information such as an expiration time to verify). The access request is generated via a graphical user interface of a security dashboard of the client device.

In some implementations, a system in accordance with the present disclosure includes means for receiving an access request to the instance from a client device; means for sending an encryption request of information to a security device, wherein the information includes an expiration time, wherein the security device encrypts the information using a private key that is stored in the security device; means for receiving the encrypted information from the security device; and means for sending the encrypted information to the client device, wherein the encrypted information is decryptable by the instance using a public key associated with the private key in response to the client device providing the encrypted information to the instance.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for authenticating access to an instance of a cloud-computing software platform, the system comprising:
   a datacenter configured to execute the instance of the cloud-computing software platform to provide a client device usage of one or more Platform-as-a-Service (PaaS) applications, the datacenter comprising:
   a server device comprising:
     a processor; and
     a memory coupled to the processor, where in the memory includes instructions executable by the processor to cause the processor to:
       receive an access request to the instance from the client device;
       send an encryption request of information to a security device in response to receiving the access request, wherein the information includes an expiration time, wherein the security device encrypts the information using a private key that is stored in the security device, and wherein the private key is non-exportable from the security device;
       receive the encrypted information from the security device; and
       send the encrypted information to the client device, wherein the encrypted information is decryptable by the instance using a public key associated with the private key in response to the client device providing the encrypted information to the instance.

2. The system of claim 1, wherein the memory includes instructions executable by the processor to cause the processor to:
   authenticate the access request before sending the encryption request to the security device.

3. The system of claim 1, wherein the memory includes instructions executable by the processor to cause the processor to:
   responsive to receiving the access request from the client device, send another access request to an agent device configured to send the encryption request to the security device.

4. The system of claim 1, wherein sending the encrypted information to the client device comprises:
   generating a token that includes the encrypted information; and
   sending the token to the client device, wherein the token is decryptable by the instance using the public key associated with the private key in response to the client device providing the token to the instance.

5. The system of claim 1, wherein the information includes a username of the client device, an authorization level, and an identification value of the instance.

6. The system of claim 1, wherein the public key is transmitted to the instance in response to the security device encrypting the information using the private key.

7. The system of claim 1, wherein the instance is configured to authenticate the client device responsive to decrypting the encrypted information and determining that a current time is before the expiration time.

8. The system of claim 1, wherein the access request is generated via a graphical user interface of a security dashboard of the client device.

9. A method for authenticating access to an instance of a cloud-computing software platform, wherein a datacenter is configured to execute the instance of the cloud-computing software platform to provide a client device usage of one or more Platform-as-a-Service (PaaS) applications, the method comprising:
   receiving, by a server device of the datacenter, an access request to the instance from the client device;
   sending, by the server device, an encryption request of information to a security device in response to receiving the access request, wherein the information includes an expiration time, wherein the security device encrypts the information using a private key that is stored in the security device, and wherein the private key is non-exportable from the security device;
   receiving, by the server device, the encrypted information from the security device; and
   sending, by the server device, the encrypted information to the client device, wherein the encrypted information is decryptable by the instance using a public key associated with the private key in response to the client device providing the encrypted information to the instance.

10. The method of claim 9, comprising:
    authenticating, by the server device, the access request before sending the encryption request to the security device.

11. The method of claim 9, comprising:
    responsive to receiving the access request from the client device, sending, by the server device, another access request to an agent device configured to send the encryption request to the security device.

12. The method of claim 9, wherein sending the encrypted information to the client device comprises:
    generating a token that includes the encrypted information; and
    sending the token to the client device, wherein the token is decryptable by the instance using the public key associated with the private key in response to the client device providing the token to the instance.

13. The method of claim 9, wherein the information includes a username of the client device, an authorization level, and an identification value of the instance.

14. The method of claim 9, wherein the private key is a 224 bit elliptic curve digital signature algorithm (ECDSA) private key.

15. The method of claim 9, wherein the instance is configured to authenticate the client device responsive to decrypting the encrypted information and determining that a current time is before the expiration time.

16. A non-transitory computer-readable storage medium for authenticating access to an instance of a cloud-computing software platform, wherein a datacenter is configured to execute the instance of the cloud-computing software platform to provide a client device usage of one or more Platform-as-a-Service (PaaS) applications, wherein the non-transitory computer-readable storage medium includes executable instructions that, when executed by a processor, facilitate performance of operations, the operations comprising:

receiving an access request to the instance from the client device;

sending an encryption request of information to a security device in response to receiving the access request, wherein the information includes an expiration time, wherein the security device encrypts the information using a private key that is stored in the security device, and wherein the private key is non-exportable from the security device;

receiving the encrypted information from the security device; and sending the encrypted information to the client device, wherein the encrypted information is decryptable by the instance using a public key associated with the private key in response to the client device providing the encrypted information to the instance.

17. The non-transitory computer-readable storage medium of claim 16, the operations comprising:

responsive to receiving the access request from the client device, sending another access request to an agent device configured to send the encryption request to the security device.

18. The non-transitory computer-readable storage medium of claim 16, wherein sending the encrypted information to the client device comprises:

generating a token that includes the encrypted information; and sending the token to the client device, wherein the token is decryptable by the instance using the public key associated with the private key in response to the client device providing the token to the instance.

19. The non-transitory computer-readable storage medium of claim 16, wherein the private key is a 224 bit elliptic curve digital signature algorithm (ECDSA) private key.

20. The non-transitory computer-readable storage medium of claim 16, wherein the instance is configured to authenticate the client device responsive to decrypting the encrypted information and determining that a current time is before the expiration time.

* * * * *